(12) United States Patent
Perez

(10) Patent No.: US 9,154,725 B1
(45) Date of Patent: Oct. 6, 2015

(54) ASSEMBLY INSTRUCTION AND WARRANTY STORAGE DEVICE

(71) Applicant: Eveyln D. Perez, Jonesboro, GA (US)

(72) Inventor: Eveyln D. Perez, Jonesboro, GA (US)

( * ) Notice: Subject to any disclaimer, the term of this patent is extended or adjusted under 35 U.S.C. 154(b) by 0 days.

(21) Appl. No.: 14/160,889

(22) Filed: Jan. 22, 2014

(51) Int. Cl.
*H04N 5/77* (2006.01)
*H04N 5/765* (2006.01)

(52) U.S. Cl.
CPC ..................... *H04N 5/765* (2013.01)

(58) Field of Classification Search
None
See application file for complete search history.

(56) References Cited

U.S. PATENT DOCUMENTS

| | | |
|---|---|---|
| D317,151 S | 5/1991 | Daly |
| 5,761,485 A | 6/1998 | Munyan |
| 5,890,180 A | 3/1999 | Fenton |
| D425,558 S | 5/2000 | Tarpenning et al. |
| 6,138,056 A | 10/2000 | Hardesty et al. |
| 6,944,421 B2 | 9/2005 | Axelrod |
| 7,823,062 B2 | 10/2010 | Liberty et al. |
| 7,912,424 B2 | 3/2011 | Tokkenen et al. |
| D672,768 S | 12/2012 | Huang et al. |
| 2001/0011266 A1 | 8/2001 | Baba |
| 2004/0215484 A1* | 10/2004 | McKnight et al. ............... 705/1 |
| 2008/0086222 A1 | 4/2008 | Kagan |
| 2010/0134964 A1* | 6/2010 | Smith et al. ............... 361/679.2 |
| 2010/0225809 A1 | 9/2010 | Connors et al. |
| 2012/0240081 A1 | 9/2012 | Sim et al. |
| 2012/0290906 A1 | 11/2012 | Robey |
| 2013/0014012 A1 | 1/2013 | Boucher et al. |
| 2013/0071029 A1* | 3/2013 | Terwilliger et al. ........... 382/183 |
| 2014/0188641 A1* | 7/2014 | Argue et al. .................... 705/21 |

FOREIGN PATENT DOCUMENTS

| | | |
|---|---|---|
| CN | 202473241 | 10/2012 |
| EP | 1065603 | 1/2001 |

OTHER PUBLICATIONS

Title:www.target.com Product Name: LAtte iPearl S 4GB Flash MP3 Player.
Title: www.bestbuy.com Product Name: Augen—TheBook Digital Text Reader.

* cited by examiner

*Primary Examiner* — William C Vaughn, Jr
*Assistant Examiner* — Eileen Adams

(57) ABSTRACT

An assembly instruction and warranty storage device stores and plays warranty information and instructive audio and video directions for assembling a product. The device includes a housing. A processor is coupled to and positioned in the housing. A memory unit is positioned in the housing. The memory unit is communicatively coupled to the processor. Audio data and visual data relating to assembly and warranty of a product is stored in the memory unit. A display screen is coupled to the housing and is operationally coupled to the processor wherein the display screen displays a video image produced from the video data stored in the memory unit. A speaker is coupled to the housing and is operationally coupled to the processor wherein the speaker broadcasts an audio transmission produced from the audio data stored in the memory unit.

11 Claims, 4 Drawing Sheets

ASSEMBLY INSTRUCTION AND WARRANTY STORAGE DEVICE

BACKGROUND OF THE DISCLOSURE

Field of the Disclosure

The disclosure relates to storage devices and more particularly pertains to a new storage device for storing and playing warranty information and instructive audio and video directions for assembling a product.

SUMMARY OF THE DISCLOSURE

An embodiment of the disclosure meets the needs presented above by generally comprising a housing. A processor is coupled to and positioned in the housing. A memory unit is positioned in the housing. The memory unit is communicatively coupled to the processor. Audio data and visual data relating to assembly and warranty of a product is stored in the memory unit. A display screen is coupled to the housing and is operationally coupled to the processor wherein the display screen displays a video image produced from the video data stored in the memory unit. A speaker is coupled to the housing and is operationally coupled to the processor wherein the speaker broadcasts an audio transmission produced from the audio data stored in the memory unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
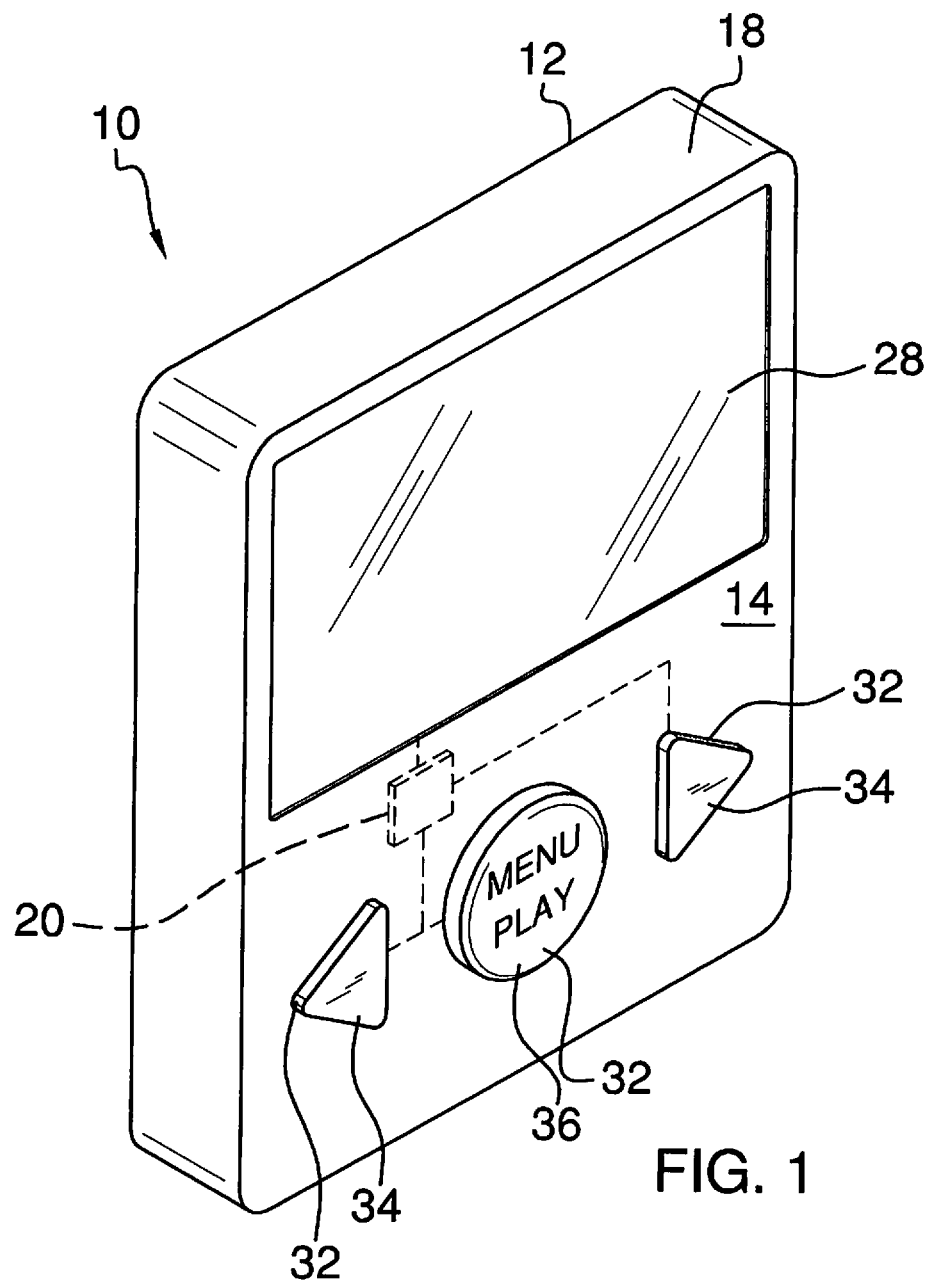
FIG. 1 is a top front side perspective view of an assembly instruction and warranty storage device according to an embodiment of the disclosure.
Figure 2:
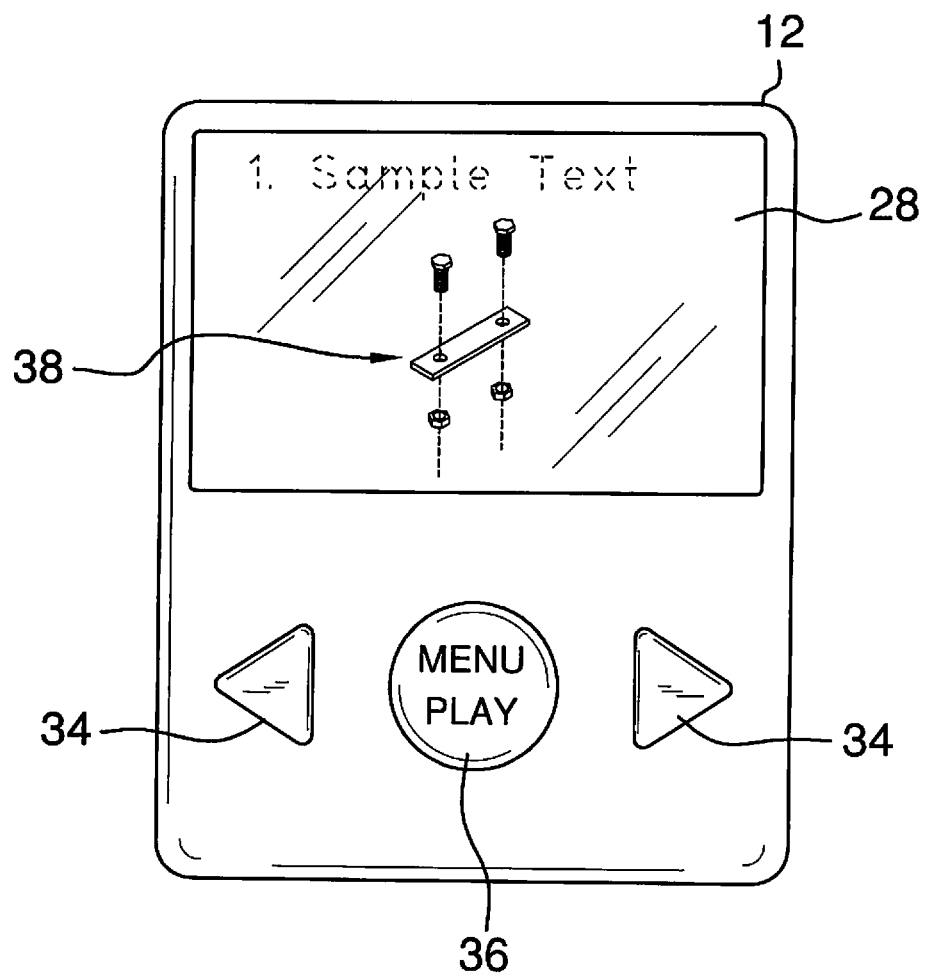
FIG. 2 is a front view of an embodiment of the disclosure.
Figure 3:
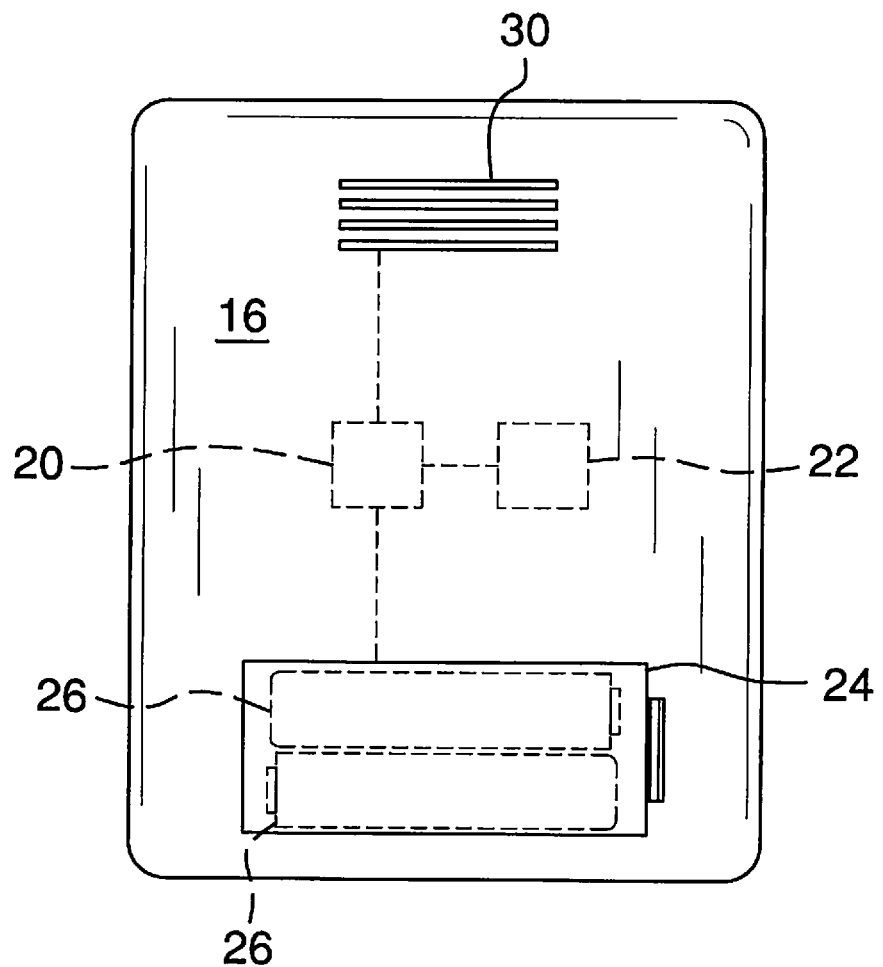
FIG. 3 is a back view of an embodiment of the disclosure.
Figure 4:
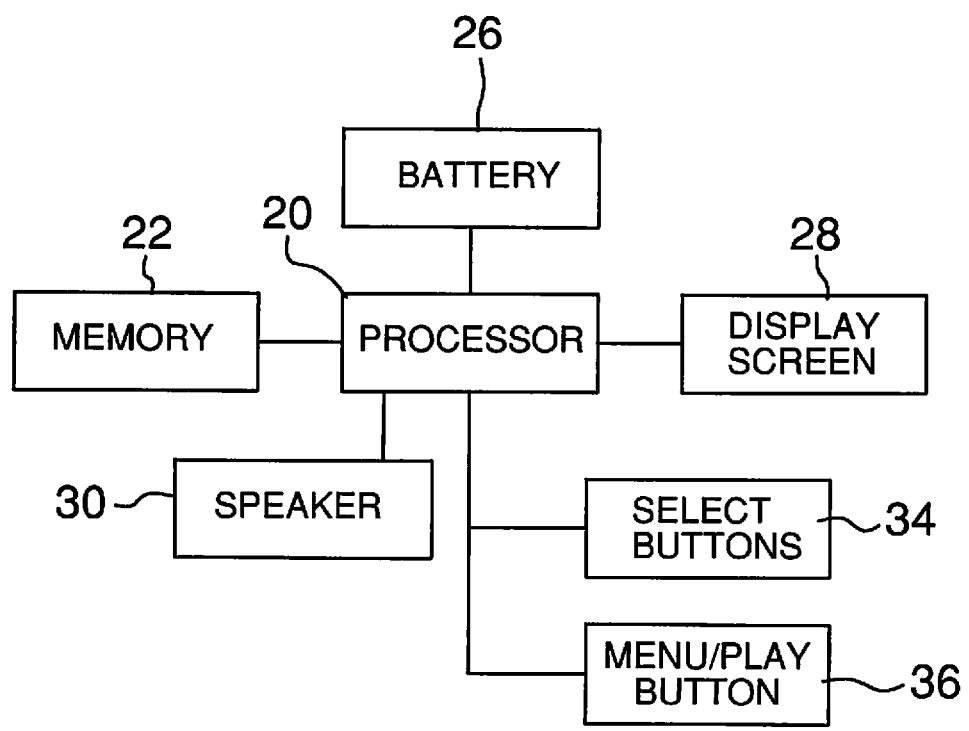
FIG. 4 is a schematic view of an embodiment of the disclosure.

With reference now to the drawings, and in particular to FIGS. 1 through 4 thereof, a new storage device embodying the principles and concepts of an embodiment of the disclosure and generally designated by the reference numeral 10 will be described.

As best illustrated in FIGS. 1 through 4, the assembly instruction and warranty storage device 10 generally comprises a housing 12 having a front face 14, a back face 16, and a perimeter edge 18 extending between and around the front face 14 and the back face 16. A processor 20 is coupled to the housing 12. The processor 20 is positioned in the housing 12. A memory unit 22 is also positioned in the housing 12. The memory unit 22 is communicatively coupled to the processor 20. A product is provided at time-of-sale with the device 10. Data relating to assembly and warranty of that product is stored in the memory unit 22. In this manner, the device 10 comes pre-programmed with the data and does not allow for the input of new data into the memory unit 22. The data may include data relating to the English language and/or foreign languages. The data includes both audio data and video data. The audio data may comprise audio only data which is unassociated with the video data whereby no video image is displayed upon transmission of the audio only data. A battery compartment 24 is positioned in the housing 12. A battery 26 is positioned in the battery compartment 24. The battery 26 is electrically coupled to the processor 20.

A display screen 28 is coupled to the housing 12. The display screen 28 is operationally coupled to the processor 20 wherein the display screen 28 displays a video image 38 produced from the video data stored in the memory unit 22. The display screen 28 may be positioned on the front face 14 of the housing 12. The video image 38 produced from the video data comprises visual demonstrations of steps required for assembly of the product. The video image 38 produced from the video data comprises a written warranty relating to the product.

A speaker 30 is coupled to the housing 12. The speaker 30 is operationally coupled to the processor 20 wherein the speaker 30 broadcasts an audio transmission produced from the audio data stored in the memory unit 22. The audio transmission produced from the audio data comprises descriptions of steps required for assembly of the product. The audio transmission produced from the audio data comprises a verbatim reading of a written warranty relating to the product.

A plurality of control buttons 32 is provided. Each of the control buttons 32 is coupled to the housing 12. Each of the control buttons 32 is positioned on the front face 14 of the housing 12. Each of the control buttons 32 is operationally coupled to the processor 20 wherein manipulation of the control buttons 32 controls operations of the processor 20 wherein display of the video images 38 and broadcast of the audio transmissions is selectively controlled by manipulation of the control buttons 32. The control buttons 32 comprise at least one navigational button 34 and a selection button 36 wherein the control buttons 32 are manipulatable to sort through and select parsed sections of the audio data and the video data.

In use, as stated above and shown in the Figures, a user purchases the device 10, which includes a product to be assembled. Data relating to assembly and warranty of that product is stored in the memory unit 22. The user manipulates the control buttons 32 to control operations of the processor 20. The speaker 30 broadcasts an audio transmission produced from the audio data stored in the memory unit 22 to describe the steps required for assembly of the product. The display screen 28 produces a video image 38 from the video data stored in the memory unit 22 to provide a visual demonstration of the steps required for assembly of the product as well as a written warranty relating to the product. In this manner, the user is provided with audio and visual data relating to assembly and warranty of the particular product that was included with the device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An assembly instruction and warranty storage device comprising:
   a housing having a front face, a back face, and a perimeter edge extending between and around said front face and said back face;
   a processor coupled to said housing, said processor being positioned in said housing;
   a memory unit positioned in said housing, said memory unit being communicatively coupled to said processor;
   data relating to assembly and warranty of a product being stored in said memory unit wherein said data is configured to be provided with the product upon sale of the product, said data including audio data and video data, said data being pre-programmed into said memory unit such that new data cannot be input into said memory unit;
   a display screen coupled to said housing, said display screen being operationally coupled to said processor wherein said display screen displays a video image produced from said video data stored in said memory unit; and
   a speaker coupled to said housing, said speaker being operationally coupled to said processor wherein said speaker broadcasts an audio transmission produced from said audio data stored in said memory unit.

2. The device of claim 1, further comprising said display screen being positioned on said front face of said housing.

3. The device of claim 1, further comprising a plurality of control buttons, each of said control buttons being coupled to said housing, each of said control buttons being positioned on said front face of said housing, each of said control buttons being operationally coupled to said processor wherein manipulation of said control buttons controls operations of said processor wherein display of said video images and broadcast of said audio transmissions is selectively controlled by manipulation of said control buttons.

4. The device of claim 1, further comprising said video image produced from said video data comprising visual demonstrations of steps required for assembly of the product.

5. The device of claim 1, further comprising said audio transmission produced from said audio data comprising descriptions of steps required for assembly of the product.

6. The device of claim 1, further comprising said video image produced from said video data comprising a written warranty relating to the product.

7. The device of claim 6, further comprising said audio transmission produced from said audio data comprising a verbatim reading of a written warranty relating to the product.

8. The device of claim 3, further comprising said control buttons comprising a navigational button and a selection button wherein said control buttons are manipulatable to sort through and select parsed sections of said audio data and said video data.

9. The device of claim 1, further comprising said audio data comprising audio only data which is unassociated with said video data whereby no video image is displayed upon transmission of said audio only data.

10. The device of claim 1, further comprising:
    a battery compartment positioned in said housing; and
    a battery positioned in said battery compartment, said battery being electrically coupled to said processor.

11. An assembly instruction and warranty storage device comprising:
    a housing having a front face, a back face, and a perimeter edge extending between and around said front face and said back face;
    a processor coupled to said housing, said processor being positioned in said housing;
    a memory unit positioned in said housing, said memory unit being communicatively coupled to said processor;
    data relating to assembly and warranty of a product being stored in said memory unit wherein said data is configured to be provided with the product upon sale of the product, said data including audio data and video data, said data being pre-programmed into said memory unit such that new data cannot be input into said memory unit, said audio data comprising audio only data which is unassociated with said video data whereby no video image is displayed upon transmission of said audio only data;
    a display screen coupled to said housing, said display screen being operationally coupled to said processor wherein said display screen displays a video image produced from said video data stored in said memory unit, said display screen being positioned on said front face of said housing, said video image produced from said video data comprising visual demonstrations of steps required for assembly of the product, said video image produced from said video data comprising a written warranty relating to the product;
    a speaker coupled to said housing, said speaker being operationally coupled to said processor wherein said speaker broadcasts an audio transmission produced from said audio data stored in said memory unit, said audio transmission produced from said audio data comprising descriptions of steps required for assembly of the product, said audio transmission produced from said audio data comprising a verbatim reading of a written warranty relating to the product;
    a plurality of control buttons, each of said control buttons being coupled to said housing, each of said control buttons being positioned on said front face of said housing, each of said control buttons being operationally coupled to said processor wherein manipulation of said control buttons controls operations of said processor wherein display of said video images and broadcast of said audio transmissions is selectively controlled by manipulation of said control buttons, said control buttons comprising a navigational button and a selection button wherein said control buttons are manipulatable to sort through and select parsed sections of said audio data and said video data;
    a battery compartment positioned in said housing; and
    a battery positioned in said battery compartment, said battery being electrically coupled to said processor.

* * * * *